United States Patent
Wei

(10) Patent No.: US 9,203,716 B2
(45) Date of Patent: Dec. 1, 2015

(54) FAULT DETECTION METHOD AND SYSTEM

(71) Applicant: Huawei Technologies Co., Ltd., Shenzhen, Guangdong (CN)

(72) Inventor: Jianwei Wei, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 256 days.

(21) Appl. No.: 13/931,041

(22) Filed: Jun. 28, 2013

(65) Prior Publication Data

US 2013/0286859 A1    Oct. 31, 2013

Related U.S. Application Data

(63) Continuation of application No. PCT/CN2011/073144, filed on Apr. 21, 2011.

(51) Int. Cl.
*H04L 12/26* (2006.01)
*H04L 12/24* (2006.01)
*H04L 12/707* (2013.01)
*H04L 12/703* (2013.01)

(52) U.S. Cl.
CPC ........ *H04L 43/0823* (2013.01); *H04L 41/0677* (2013.01); *H04L 43/10* (2013.01); *H04L 45/24* (2013.01); *H04L 45/28* (2013.01)

(58) Field of Classification Search
CPC . H04L 43/0823; H04L 43/10; H04L 41/0677; H04L 45/24; H04L 45/28; H04L 41/0654
USPC ......... 370/241, 242, 244, 248, 250; 379/1.01, 379/2, 9, 15.01, 16
See application file for complete search history.

(56) References Cited

U.S. PATENT DOCUMENTS

| 2002/0120730 | A1 | 8/2002 | Goudzwaard et al. |
| 2005/0201273 | A1* | 9/2005 | Shimizu ........................ 370/216 |
| 2006/0002311 | A1* | 1/2006 | Iwanaga et al. ................ 370/254 |
| 2006/0034288 | A1* | 2/2006 | Lataretu ..................... 370/395.2 |

(Continued)

FOREIGN PATENT DOCUMENTS

| CN | 101459547 A | 6/2009 |
| CN | 101471822 A | 7/2009 |
| EP | 1610496 A1 | 12/2005 |

OTHER PUBLICATIONS

International Search Report in corresponding PCT Patent Application No. PCT/CN2011/073144 (Feb. 2, 2012).

(Continued)

*Primary Examiner* — Obaidul Huq
(74) *Attorney, Agent, or Firm* — Leydig, Voit & Mayer, Ltd.

(57) ABSTRACT

Embodiments of the present invention provide a fault detection method and system. The method includes: sending port scan packets based on at least two port pairs to a destination end, where each port pair includes a source port number and a destination port number and corresponds to a path between a source end and the destination end; receiving a response packet sent by the destination end, where the response packet carries a port pair which does not receive a port scan packet; and based on the port pair, determining a faulty path. Based on the embodiments of the present invention, port scan packets are sent based on multiple port pairs, so that the port scan packets can reach the destination end through multiple paths, so as to detect multiple paths between the source end and the destination end. The present invention can implement more efficient fault detection.

16 Claims, 4 Drawing Sheets

(56) References Cited

U.S. PATENT DOCUMENTS

2008/0253295 A1* 10/2008 Yumoto et al. ............... 370/245
2008/0263666 A1* 10/2008 Keohane et al. ............... 726/23

OTHER PUBLICATIONS

Extended European Search Report in corresponding European Patent Application No. 11752861.2 (Jun. 19, 2013).

Allan, David, "Y.1711 and LSP-PING," Feb. 2003, The Internet Society, Reston, VA.

Qian et al., "ICMP Extension for One-Way Performance Metrics," Aug. 2000, IETF, Fremont, CA.

Xi et al., "Enabling Flow-based Routing Control in Data Center Networks using Probe and ECMP," 2011, IEEE, New York, New York.

* cited by examiner

FAULT DETECTION METHOD AND SYSTEM

CROSS-REFERENCE TO RELATED APPLICATIONS

This application is a continuation of International Patent Application No. PCT/CN2011/073144, filed on Apr. 21, 2011, which is hereby incorporated by reference in its entirety.

FIELD OF THE INVENTION

The present invention relates to the field of network communications, and in particular, to a fault detection method and system in the field of network communications.

BACKGROUND

It is an undeniable fact that future service development trends towards all-IP (Internet Protocol, Internet protocol) networks. More and more carriers bear conventional telecommunication services and emerging services on an IP network, so as to acquire characteristics and advantages such as a new service, a high bandwidth utilization ratio, and a low cost. As a significant characteristic of the IP network, equal-cost multipath (Equal-Cost MultiPath, ECMP) greatly improves a resource utilization ratio of the IP network and balances a load of the IP network, but brings great difficulty to fault detection and location of the IP network.

The ECMP can make multiple equal-cost paths share an IP packet load sent from a source end to a destination end, so as to achieve the purpose of making the most of resources of a bearer network. The so-called equal-cost paths means that among multiple paths that exist between the source end and the destination end, if some paths have equal path overheads, for example, the same number of hops, these paths are equal-cost paths.

A router generally supports ECMP load sharing based on a 2-tuple (a source IP address and a destination IP address) and a 5-tuple (a source IP address, a destination IP address, a protocol number, a source port, and a destination port). In the ECMP load sharing of the 5-tuple, a router groups packets passing through the router, where packets having the same 5-tuple are grouped together, and designates one path for packets of each group according to a load sharing algorithm. In this way, if protocol numbers, source port numbers, or destination port numbers of packets sent from a same source end to a same destination end are different from each other, the packets may pass through different paths. In a network, represented by an ECMP network, where path selection is based on ports, for the packets from the same source end to the same destination end, routing can be performed according to a port pair formed of a source port number and a destination port number, so as to distribute traffic from the same source end to the same destination end.

However, when the network (for example, an ECMP network that performs load sharing by using the ECMP) where path selection is based on ports is faulty, due to a fact that different paths cannot be passed through based on ports in an existing network fault detection method, it is difficult to detect the fault and to locate the fault.

At present, a connectivity test may be performed by using a Ping command, so as to detect whether a network fault exists. When the Ping command is used, the source end sends an ICMP (Internet Control Message Protocol, internet control message protocol) echo request packet (type 8) to the destination end. When the destination end receives the ICMP echo request packet, the destination end returns an ICMP echo response packet (type 0), and the source end can calculate round-trip time and a packet loss rate. If the source end does not receive the ICMP echo response packet within a certain time, the source end determines that the destination end is unreachable and the IP network is faulty. Because Ping packets sent through the Ping command have a same source IP address and a same destination IP address and a same protocol number 1, but do not have a port number, the Ping packets sent from the source end to the destination end can only pass through a same path, and connectivity of only one path can be tested through the Ping packets. When another path is faulty, the Ping packet cannot sense and therefore cannot determine existence of the fault of the another path. Moreover, the Ping command cannot locate the fault.

A network fault may also be detected by using a bidirectional forwarding detection (Bidirectional Forwarding Detection, BFD) packet. The source end and the destination end periodically send to each other a BFD detection packet on a session channel established between the source end and the destination end. A protocol number of the BFD packet is 17, and a source port number and a destination port number of the BFD packet are both 3784. If the source end or the destination end does not receive a detection packet sent by the other party within a sufficiently long time, it is considered that the channel between the source end and the destination end is faulty. Because 5-tuples of BFD packets sent from one party to the other party are the same, in the network where path selection is based on ports, the BFD packet can pass through only one path, so that a fault of only one path can be detected, while faults of other equal-cost paths between the source end and the destination end cannot be detected. Meanwhile, a fault cannot be located by BFD either.

Furthermore, a path between the source end and the destination end may also be determined by using a Traceroute (traceroute) command, so as to find whether an fault exists on the path and where the fault is located. In a Traceroute operation, a TTL (time to live) field in an IP packet header is modified and an ICMP timeout packet is used, which can implement fault detection and location. The source end sends an ICMP echo request packet to the destination end by progressively increasing the TTL field. A router receiving the ICMP echo request packet reduces the TTL by 1, and if the router finds that the TTL is 0, the router discards the packet, and returns an ICMP timeout packet (type 11) to the source end. In this way, an address of a certain router may be obtained. If the address of the certain router is not obtained, it is considered that the router is faulty. However, although Traceroute packets sent from the source end to the destination end have a same source IP address, a same destination IP address, and a same protocol number (1), the packets have no source port number and no destination port number, so the Traceroute packets may also pass through only one path and a fault of only one path can be detected.

It can be seen that, in the foregoing relevant technologies, port numbers are not distinguished in a fault detection process, sent packets can only pass through a same path, so a fault of only one path can be detected, and faults of other paths between the source end and the destination end cannot be detected. In this way, in the network (for example, the ECMP network) where path selection is based on ports, a fault between the source end and the destination end cannot be effectively detected.

SUMMARY

Embodiments of the present invention provide a fault detection method and system, which can effectively detect a network fault between a source end and a destination end, so that multiple paths which each corresponds to a port pair formed of a source port number and a destination port number and is between the source end and the destination end can be effectively detected, thereby conveniently determining existence of the network fault.

In one aspect, an embodiment of the present invention provides a fault detection method, including: sending port scan packets based on at least two port pairs to a destination end, where each port pair includes a source port number and a destination port number and corresponds to a path between a source end and the destination end; receiving a response packet sent by the destination end, where the response packet carries a prot pair which does not receive a port scan packet and is determined by the destination end based on the port scan packets; and based on the port pair carried by the response packet, determining a faulty path.

In another aspect, an embodiment of the present invention provides a system for fault detection. The system includes a source measurement point and a destination measurement point. The source measurement point includes: a first sending module, configured to send port scan packets based on at least two port pairs to the destination measurement point, where each port pair includes a source port number and a destination port number and corresponds to a path between the source measurement point and the destination measurement point; a first receiving module, configured to receive a response packet sent by the destination measurement point, where the response packet carries a port pair which does not receive a port scan packet and is determined by the destination measurement point based on the port scan packets; and a first determination module, configured to, based on the port pair carried in the response packet, determine a faulty path. The destination measurement point includes: a second receiving module, configured to receive the port scan packets from the source measurement point; a second determination module, configured to, based on the port scan packets, determine a port pair which does not receive a port scan packet; and a second sending module, configured to send, to the source measurement point, a response packet carrying the determined port pair.

Based on the foregoing technical solutions provided by the embodiments of the present invention, in order to detect multiple paths between the source end and the destination end, the source end may send, based on at least two port pairs, port scan packets for detecting a path fault, so that the port scan packets can reach the destination end through the multiple paths, and the destination end determines, according to the port pairs carried in the received port scan packets, a port pair which does not receive a port scan packet, so as to determine that a path corresponding to the port pair which does not receive a port scan packet is faulty. In this way, the port scan packets can pass through paths corresponding to different port pairs, so that the multiple paths between the source end and the destination end may be detected. Compared with a relevant technology where only one path can be detected, the present invention can implement more efficient fault detection and accurately find the existence of a fault in the network.

BRIEF DESCRIPTION OF THE DRAWINGS

To illustrate the technical solutions in the embodiments of the present invention more clearly, accompanying drawings required for describing the embodiments are briefly introduced in the following. Apparently, the accompanying drawings in the following description merely show some embodiments of the present invention, and persons of ordinary skill in the art may still derive other drawings from these accompanying drawings without creative efforts.

DETAILED DESCRIPTION

The technical solutions in the embodiments of the present invention are clearly and completely described in the following with reference to the accompanying drawings in the embodiments of the present invention. Apparently, the embodiments to be described are merely part rather than all of the embodiments of the present invention. All other embodiments obtained by persons of ordinary skill in the art based on the embodiments of the present invention without creative efforts shall fall within the protection scope of the present invention.

Figure 1:
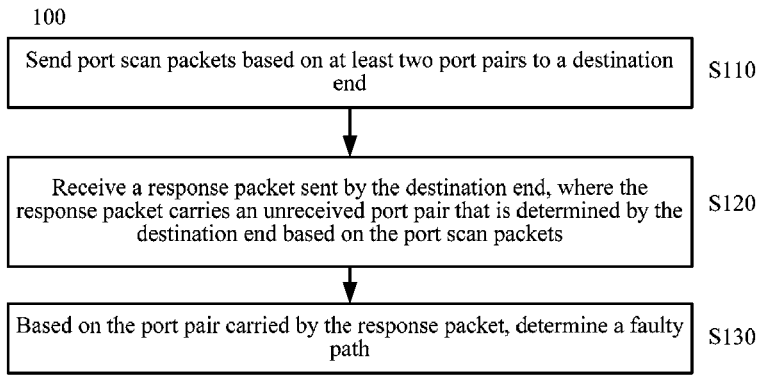
FIG. 1 is a flow chart of a fault detection method according to an embodiment of the present invention.

First, a fault detection method 100 according to an embodiment of the present invention is described in combination with FIG. 1.

As shown in FIG. 1, the method 100 includes: in S110, sending port scan packets based on at least two port pairs to a destination end, where each port pair includes a source port number and a destination port number and corresponds to a path between a source end and the destination end; in S120, receiving a response packet sent by the destination end, where the response packet carries a port pair which does not receive a port scan packet and is determined by the destination end based on the port scan packets; and in S130, based on the port pair carried by the response packet, determining a faulty path.

Multiple paths may exist between the source end and the destination end, and each path may correspond to a port pair formed of a source port number and a destination port number. A forwarding node (for example, a router) between the source end and the destination end may route and forward an IP packet based on a source port number and a destination port number that are carried in the IP packet. In order to detect a network fault between the source end and the destination end, the source end scans port pairs and generates a port scan packet based on each of the multiple scanned port pairs, so that the port scan packet can be sent to the destination end through a path corresponding to a port pair carried in the port scan packet. The destination end continuously receives port scan packets from the source end, determines which port pair or port pairs failed to receive a port scan packet, and returns a port pair that does not receive a port scan packet, as fault information to the source end. The source end determines, based on the returned fault information, that a path corresponding to the returned port pair is faulty, so as to detect a fault existing in the network.

According to the fault detection method provided by the embodiment of the present invention, the source end sends, based on multiple port pairs, port scan packets for detecting a path fault, so that the port scan packets can reach the destination end through paths corresponding to different port pairs, and the destination end determines, according to the port pairs carried in the received port scan packets, a port pair which does not receive a port scan packet, so as to determine that a path corresponding to the port pair which does not receive a port scan packet is faulty. In this way, the port scan packets can pass through paths corresponding to different port pairs, so that the multiple paths between the source end and the destination end can be detected. Compared with the prior art where only one path can be detected, the present invention can implement more efficient fault detection and accurately find existence of a fault in the network.

Next, S110 to S130 according to the embodiment of the present invention are described in detail.

In S110, in a network, such as an ECMP network, where path selection is based on ports, an IP packet sent from the source end to the destination end have a same source IP address and a same destination IP address, so a path of the IP packet is related to a port pair formed of a source port number and a destination port number. Even if routing is also related to a protocol number, if the protocol number is fixed, the path of the IP packet is only related to the port pair. In this way, each port pair may correspond to one path between the source end and the destination end, and paths corresponding to multiple port pairs may be the same.

A fault of a path between the source end and the destination end can be detected through a port scan packet sent based on a port pair. The port scan packet carries the port pair, so the port scan packet can pass through a path corresponding to the carried port pair, thereby performing fault detection on the path. If the port pair carried in the port scan packet is changed, multiple paths in a network, where routing is, for example, based on a 5-tuple, can be covered. If the destination end can receive a port scan packet, it indicates that a path through which the port scan packet passes is not faulty; otherwise, it indicates that a path corresponding to a port pair carried in the port scan packet is faulty.

According to an embodiment of the present invention, the source end can sequentially traverse the at least two port pairs, and based on a currently traversed port pair, send a port scan packet based on the port pair to the destination end.

Multiple port pairs exist because multiple paths exist between the source end and the destination end. By sequentially traversing the multiple port pairs existing between the source end and the destination end, that is, sequentially scanning the port pairs, the source end may send a port scan packet corresponding to a currently scanned port pair. Therefore, port scan packets sent by the source end may pass through the multiple paths between the source end and the destination end, so that the multiple paths between the source end and the destination end are covered.

According to an embodiment of the present invention, a source port number and a destination port number in each port pair may be equal to each other. Generally, in a telecommunication network based on an IP network, a source end and a destination end that communicate with each other using a same port number, so that a source port number and a destination port number in an IP packet are the same. Therefore, a path between the source end and the destination end may be represented by the source port number and the destination port number that are equal to each other. Even if in the IP network, a path through which an IP packet carrying service information passes corresponds to a source port number and a destination port number that are different from each other, a source port number and a destination port number that are used for fault detection may also be the same. In this case, although a path through which a port scan packet for fault detection passes is different from the path through which the IP packet carrying service information passes, paths between the source end and the destination end may also be covered with port scan packets by traversing port pairs.

When the port pairs are sequentially traversed or scanned in a manner where a source port number equals a destination port number, because the port numbers range from 0 to 65535, port numbers ranging from 0 to 65535 are scanned in sequence each time of scanning. For example, first, a port scan packet with a source port number and a destination port number being both 0 is sent, then a port scan packet with a source port number and a destination port number being both 1 is sent, and then a port scan packet with a source port number and a destination port number being both 2 is sent. The rest can be done in the same manner, until a response message is received from the destination end. Up to dozens of equal-cost paths (determined according to the number of router hops and networking) generally exist between the source end and the destination end, so in general, only dozens of port pairs need to be scanned to cover the equal-cost paths between the source end and the destination end.

If a source port number and a destination port number in each port pair are not always the same, each time of scanning, the source end may first fix a source port number and scan destination port numbers, and then increase the source port number by 1 and scan the destination port numbers. The rest can be done in the same manner. For example, the source end first fixes the source port number at 0, sets the destination port numbers to 0 to 65535, and sends corresponding port scan packets; then, sets the source port number to 1, sets the destination port numbers to 0 to 65535, and sends corresponding port scan packets. The rest can be done in the same manner. In this way, no matter whether the source port number and the destination port number are the same, multiple port pairs can be used to perform fault detection on multiple paths in the network.

According to an embodiment of the present invention, the port scan packet may be identified by a DF (Don't Fragment, don't fragment) flag bit, an MF (More Fragments, more fragments) flag bit, and an offset field in an IP header.

The fields in the IP header of the port scan packet may be re-defined, so that the destination end can recognize the port scan packet. The destination end directly discards the port scan packet after processing the port scan packet, and does not submit the port scan packet to a service processing module. In this way, fault detection does not affect normal service processing.

A current packet may be represented as a port scan packet by filling the DF flag bit, the MF flag bit, and the offset field in the IP header with specific fields. In this case, a form for filling the DF flag bit, the MF flag bit, and the offset field need to be different from that in existing common usage. Currently, when the DF flag bit is 0, the MF flag bit and the offset field are both 0; when the DF flag bit is 1, the MF flag bit may be 1, and in this case, the offset field may be any value; when the DF flag bit is 0, the MF flag bit may also be 0, and in this case, the offset field is 0.

In order to be distinguished from an existing usage, according to an embodiment of the present invention, a value of the DF flag bit may be set to 1, a value of the MF flag bit may be set to 0, and a value of the offset field may not be set to all 0. In order to be compatible with meanings of an existing protocol, the DF flag bit with the value 1 may be used to indicate that fragmenting is not performed; the MF flag bit with the value 0 may be used to indicate that no more fragment exists; and the offset field with a value being not all 0 may be used to indicate, in combination with the DF flag bit and the MF flag bit, that the packet is a port scan packet. For example, when the DF flag bit is 1, the MF flag bit is 0, and the offset field is 1010101010101, it may be indicated that the current packet is a port scan packet.

The DF flag bit, the MF flag bit, and the offset field in the IP header are re-defined as identifiers of the port scan packet, which neither conflicts with the current use nor causes exception in current data processing, and can greatly improve efficiency of recognizing the port scan packet. The port scan packet can be recognized through the IP header, so deep packet analysis does not need to be performed on the port scan packet, and a normal service is not affected.

In S120, the source end sequentially scans the port pairs and sends corresponding port scan packets to the destination end, so that if the destination end does not receive a port scan packet corresponding to a certain port pair, it indicates that a path through which the port scan packet passes is faulty, so the destination end carries a port pair which does not receive a port scan packet as fault information in a response packet and returns the response packet to the source end. The response packet may be an ICMP packet, may also be a UDP (user Datagram Protocol, user datagram protocol) datagram, and definitely, may also be an IP packet in another form.

In S130, the source end extracts, from the response packet, the port pair returned as the fault information, and determines that a path corresponding to the port pair is faulty, thereby completing network fault detection.

An example of specific implementation of the method 100 is described by taking scanning port pairs in a manner that a source port number equals a destination port number as an example. The process is as follows:

In S110, the source end sends, to the destination end, a port scan packet carrying a currently scanned port pair. In the port scan packet, a source IP address is a source end IP address, a destination IP address is a destination end IP address, a protocol number is 17 (the UDP protocol), and a source port number and a destination port number are both equal to a currently scanned port number. For each scanned port number, the source end may send multiple same port scan packets to the destination end, so as to avoid a decoding failure of the destination end or a failure in recognizing the port scan packet caused by interference, thereby avoiding an effect on the fault detection. For example, for each scanned port number, three same port scan packets may be sent.

Although the port scan packet sent in S110 is a UDP datagram, persons skilled in the art may figure out that the port scan packet may also be a TCP (Transmission Control Protocol, transmission control protocol) datagram, and in this case, a protocol number carried in the port scan packet is 6. The UDP datagram or the TCP datagram is used as the port scan packet, so that during port scanning, port scan packets based on different port pairs can pass through different paths.

In S120, the destination end receives the port scan packet sent by the source end, if it is found that a port scan packet corresponding to a certain port pair is not received, returns port scan fault information to the source end, and carries the port pair in a response packet and sends the response packet to the source end. For example, if the destination end receives a port scan packet with a source port number and a destination port number being both 98, and receives a port scan packet with a source port number and a destination port number being both 100, but does not receive a port scan packet with a source port number and a destination port number being both 99, the destination end returns a port pair with the source port number and the destination port number being both 99 as scan fault information to the source end. The response packet carrying the fault information may be an ICMP packet in a Ping manner, may also be a UDP datagram, and definitely, may also be an IP packet in another form, as long as the source end can be notified.

In S130, the source end can know, according to the port pair carried in the received response packet, that the destination end does not receive the port scan packet corresponding to the port pair, so as to determine that the path through which the port scan packet passes is faulty.

According to the fault measurement method provided by the embodiment of the present invention, the source end sequentially traverses the port pairs, so that the port scan packets can reach the destination end through the multiple paths and the port scan packets can pass through the paths corresponding to the different port pairs, so as to implement detection on the multiple paths between the source end and the destination end. Compared with the prior art where only one path can be detected, the present invention can implement more efficient fault detection and accurately find existence of a fault in a network. Furthermore, through the DF flag bit, the MF flag bit, and the offset field in the IP header, the port scan packet can be conveniently identified, which does not conflict with the current use but greatly improves efficiency of recognizing the port scan packet. Deep packet analysis does not need to be performed on the port scan packet, and a normal service is not affected.

Figure 2:
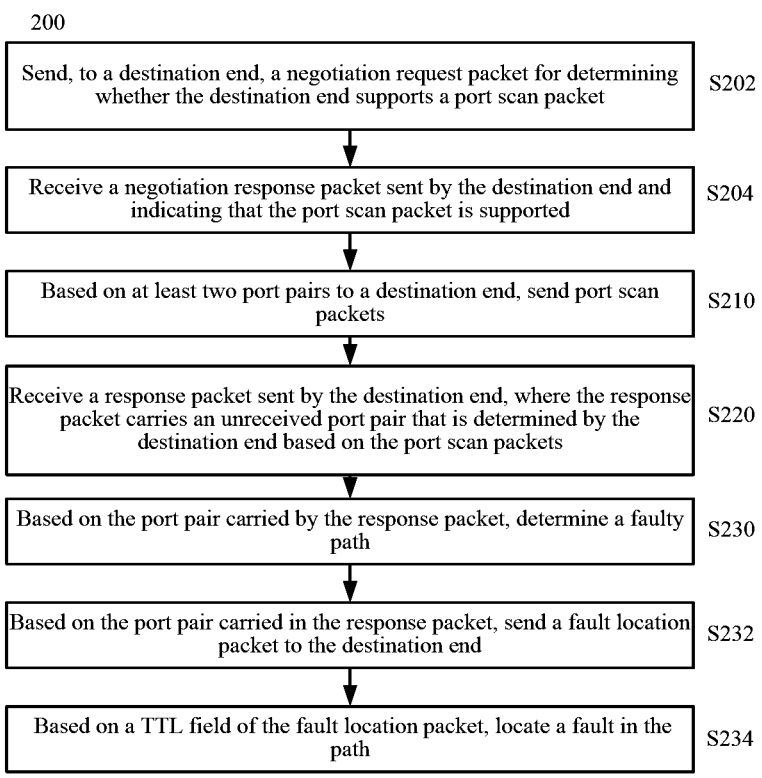
FIG. 2 is a flow chart of another fault detection method according to an embodiment of the present invention.

Next, a fault detection method 200 according to an embodiment of the present invention is described in combination with FIG. 2. S210, S220, and S230 of the method 200 are basically the same as S110, S120, and S130 of the method 100.

According to an embodiment of the present invention, before S210 of the method 200, the method 200 may also include S202 and S204.

In S202, send, to a destination end, a negotiation request packet for determining whether the destination end supports a port scan packet.

When a network is measured by using the fault detection method according to the embodiment of the present invention, a source end cannot determine whether the destination end supports the method, that is, the source end cannot determine whether the destination end supports the port scan packet. If the destination end supports the port scan packet, the destination end can recognize the port scan packet, knows that the port scan packet is used for network fault detection and a port pair carried in the port scan packet indicates that a path corresponding to the port pair is not faulty, and returns fault information to the source end in a case of not receiving a certain port pair.

The source end cannot determine whether the destination end supports the port scan packet, so the source end may send the negotiation request packet to the destination end to determine whether the destination end supports the port scan packet, so as to prevent fault detection according to the embodiment of the present invention from being performed meaninglessly in a case that the destination end does not support the port scan packet, and avoid a processing burden to the destination end that does not support the port scan packet, thereby avoiding an effect on processing performance of the destination end.

In S204, receive a negotiation response packet that is sent by the destination end and used for indicating that the port scan packet is supported.

If the destination end supports the port scan packet, that is, the destination end can support the fault detection method according to the embodiment of the present invention, the negotiation response packet is returned to the source end; otherwise, the destination end does not respond to the negotiation request packet, or responses in a form of not supporting the port scan packet.

Figure 3:
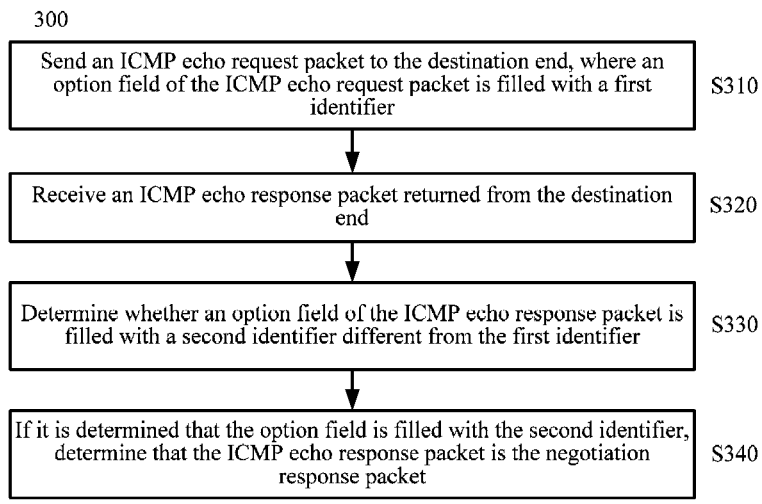
FIG. 3 is a flow chart of a method for determining whether a destination end supports a port scan packet according to an embodiment of the present invention.

According to an embodiment of the present invention, a source end can use a method 300 shown in FIG. 3 to determine whether a destination end supports a port scan packet.

In S310, send an ICMP echo request packet to the destination end, where an option field of the ICMP echo request packet is filled with a first identifier.

For example, the option field, that is, a data field, of the ICMP echo request packet may be filled with a first identifier A, where A may be a special character string. The ICMP echo request packet with the option field carrying A is sent to the destination end.

In S320, receive an ICMP echo response packet returned from the destination end.

In response to the ICMP echo request packet, the destination end returns the ICMP echo response packet.

In S330, determine whether an option field of the ICMP echo response packet is filled with a second identifier different from the first identifier.

The source end fills the option field of the ICMP echo request packet with the first identifier to assist in determining whether the destination end supports the port scan packet.

If the destination end supports the port scan packet, that is, the destination end supports the fault detection method provided by the embodiment of the present invention, the destination end may fill the ICMP echo response packet with a second identifier B different from the first identifier A and return the ICMP echo response packet to the source end. The second identifier B may also be a special character string, as long as it is different from the first identifier A.

If the destination end does not support the port scan packet, the destination end does not know the meaning of the first identifier A. When returning the ICMP echo response packet, the destination end does not modify the first identifier A. That is to say, if the destination end does not support the port scan packet, the ICMP echo response packet returned by the destination end still carries the first identifier A in the option field.

In S340, if it is determined that the option field is filled with the second identifier, determine that the ICMP echo response packet is a negotiation response packet.

If it is determined in S320 that the option field in the ICMP echo response packet carries the second identifier, it indicates that the destination end supports the port scan packet, that is, the destination end supports the fault detection method according to the embodiment of the present invention. In this case, the ICMP echo response packet is a negotiation response packet indicating that the destination end supports the port scan packet.

According to the method that is for determining whether the destination end supports the port scan packet and provided by the embodiment of the present invention, an existing ICMP echo request packet and ICMP echo response packet may be used, only the option field is filled with an identifier at the same time when a Ping operation is performed, so as to conveniently determine whether the destination end supports the port scan packet. The implementation is simple.

Returning to FIG. 2, according to an embodiment of the present invention, after S230, the method 200 may further include S232 and S234.

In S232, based on a port pair carried in a response packet, send a fault location packet to the destination end.

The port pair carried in the response packet indicates that a path corresponding to the port pair is faulty, so the source end can further locate a fault of the faulty path, so as to determine which network segment or which router is faulty.

In order to locate the fault, the source end may adopt a manner of a Traceroute operation. In the fault location packet sent by the source end to the destination end, a source port number and a destination port number that are the same as those in a port scan packet may be used, so that the fault location packet and the port scan packet pass through the same path. If the network routing is further related to a protocol number, the fault location packet needs to use a same protocol number as that of the port scan packet. However, as long as the protocol number is fixed, the fault location packet and the port scan packet can pass through the same path when carrying the same port number. Therefore, in a case that the source port number and the destination port number corresponding to the faulty path are determined, the fault location packet carries the faulty port pair, and then the fault in the faulty path can be located through the Traceroute operation.

For example, when the port scan packet for fault detection is a UDP datagram with a protocol number 17, the fault location packet for fault location is also a UDP datagram with a protocol number 17. When the port scan packet is a TCP datagram with a protocol number 6, the fault location packet is also a TCP datagram with a protocol number 6. In this way, the port scan packet and the fault location packet have a same 5-tuple and pass through the same path, so that the fault location packet passes through the faulty path, thereby completing the fault location. In this case, the Traceroute operation is completed through the UDP datagram or the TCP datagram. The UDP datagram or the TCP datagram carries port pair information returned by the destination end through the response packet, so that the UDP datagram or the TCP datagram passes through the faulty path.

In S234, based on a TTL field of the fault location packet, locate a fault in the path.

A manner for locating a fault by modifying a TTL field is basically the same as a relevant technology. A specific process is as follows:

For example, when a UDP datagram is used for fault location, the source end sends, to the destination end, a UDP datagram (an example of the fault location packet) with a TTL field being 1. In the UDP datagram, a source IP address is a source end IP address, a destination IP address is a destination end IP address, a protocol number is 17, a source port number is a faulty source port number (that is, a source port number in a port pair returned through a response message), a destination port number is a faulty destination port number (that is, a destination port number in a port pair returned by a response message). A first router that processes the UDP datagram reduces a TTL value by 1, finds the TTL is 0, discards the UDP datagram, and returns an ICMP timeout packet (type 11). In this way, an IP address of the first router in the path is obtained.

Then, the source end sends a UDP datagram with a TTL field being 2 to the destination end, where a 5-tuple in the UDP datagram is the same as that described above. The first router reduces the TTL by 1, finds the TTL is not 0, and forwards the UDP datagram to a second router. The second router reduces the TTL value by 1, finds the TTL is equal to 0, discards the UDP datagram, and returns an ICMP timeout packet. In this way, an IP address of the second router in the path is obtained.

This process continues until no ICMP timeout packet is received after a UDP datagram with a certain TTL value is sent. A router that does not return an ICMP timeout packet is a fault point. It can be determined, through the fault point, that the router is faulty or a network segment between the router and a previous-hop router is faulty.

According to the fault detection method provided by the embodiment of the present invention, before fault detection, it is determined whether the destination end supports the port scan packet, so as to prevent the port scan packet from being sent blindly and an unnecessary processing burden from being brought to a destination end that does not support the port scan packet, so that the fault detection method can be effectively executed. After the fault detection, the fault location packet such as the UDP datagram and the TCP datagram is used to locate the fault based on the Traceroute operation, so as to determine a specific position of the fault more accurately, which is beneficial to fault elimination and repair.

Figure 4:
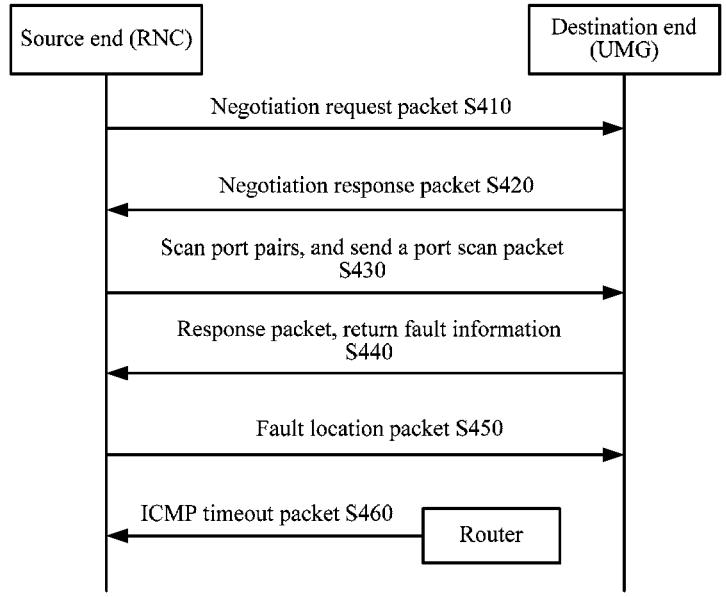
FIG. 4 is a schematic diagram of an example of performing fault detection and fault location between an RNC (Radio Network Controller, radio network controller) and a UMG (Universal Media Gateway, universal media gateway) by using a fault detection method according to an embodiment of the present invention.

Next, an example of performing fault detection and fault location between an RNC and a UMG by using the fault detection method is described with reference to FIG. 4.

With the advance of IP-based telecommunication, more and more operators gradually move voice services to an IP network. A path through which a voice data packet passes, for example, base station 1-RNC1-UMG1-RNC2-base station 2, is borne on an IP bearer network. Most of the IP bearer networks start load sharing based on a 5-tuple. Voice services of different users may be in different bearer paths. When a fault occurs, it is difficult to detect and locate the fault.

When fault detection needs to be performed between an RNC (for example, RNC1) and a UMG (for example, UMG1), the fault detection method according to the embodiment of the present invention may be used. FIG. 4 is a schematic diagram of fault detection between an RNC and a UMG, where the RNC is a source end and the UMG is a destination end.

In S410, the RNC sends a negotiation request packet to the UMG, where the negotiation request packet is an ICMP echo request packet, and an option field in the ICMP echo request packet is filled with a special character string A.

In S420, the UMG returns a negotiation response packet to the RNC, so as to indicate that the UMG also supports the fault detection method according to the embodiment of the present invention. The negotiation response packet is an ICMP echo response packet, and an option field in the ICMP echo response packet is filled with a special character string B.

In S430, the RNC sequentially scans port pairs, and based on a currently scanned port pair, sends a port scan packet carrying the port pair. A call of a pair of users occupies a source port number and a destination port number that are the same, so during scanning, sequential traversal is performed in a manner that the source port number is equal to the destination port number. In the port scan packet, a source IP address is an IP address of the RNC, a destination IP address is an IP address of the UMG, a protocol number is 17, and the source port number is equal to the destination port number. Sequential traversal is performed from 0 to 65535. For each port number, three same port scan packets may be sent.

In S440, if the UMG finds that a port scan packet corresponding to a certain port pair is not received, the UMG sends a response packet to the RNC, so as to return port scan fault information. For example, if the UMG receives a port scan packet with a port number 100 but does not receive a port scan packet with a port number 99, the UMG returns, to the RNC, a response packet carrying the port number 99. The response packet may be an ICMP packet, and may also be a packet in another form.

In S450, after receiving the response packet, the RNC stops port scanning, locates a fault in a path corresponding to the faulty port (for example, the port number 99) according to the fault information acquired from the response packet, and sends a fault location packet to the UMG. In the fault location packet, a source IP address is the IP address of the RNC, a destination IP address is the IP address of the UMG, a protocol number is 17, and a source port number and a destination port number are both a faulty port number (for example, the port number 99). In a manner of a Traceroute operation, the fault location packet is sent by modifying a TTL value.

In S460, a router receiving the fault location packet on the faulty path reduces the TTL value by 1, and if the TTL is 0, returns a fault location response packet, that is, an ICMP timeout packet. Operations on the fault location packet and the fault location response packet are similar to the Traceroute operation. For details, reference may be made to S232 and S234 in the method 200 of FIG. 2. Based on a router that does not return an ICMP timeout packet and is on the fault path, a fault can be located.

The fault detection method according to the embodiment of the present invention is described in the foregoing. Structural block diagrams of a system for fault detection are described in the following in combination with FIG. 5 and FIG. 6.

Figure 5:
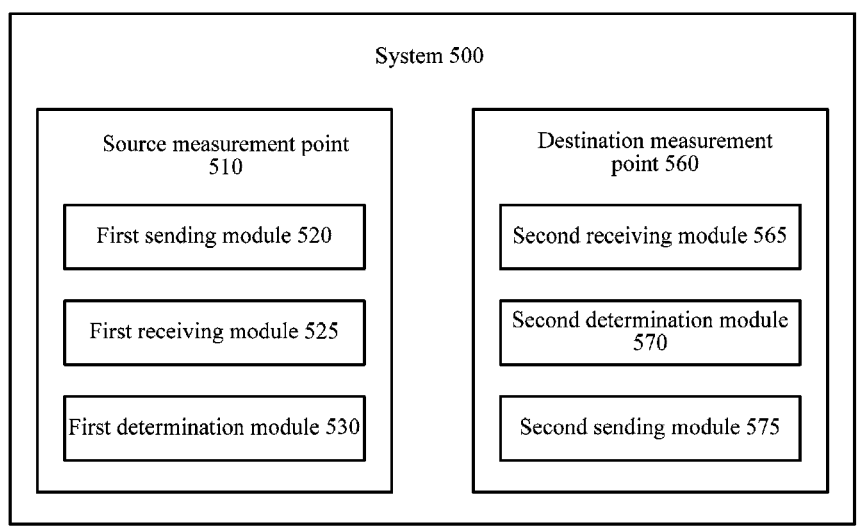
FIG. 5 is a structural block diagram of a system for fault detection according to an embodiment of the present invention.

As shown in FIG. 5, a fault detection system 500 includes a source measurement point 510 and a destination measurement point 560. The source measurement point 510 and the destination measurement point 560 may be network elements in a network, and may also be functional modules located on a network element. A fault of multiple paths (for example, multiple equal-cost paths) between the source measurement point 510 and the destination measurement point 560 can be detected by executing the foregoing method between the source measurement point 510 and the destination measurement point 560.

The source measurement point 510 includes a first sending module 520, a first receiving module 525, and a first determination module 530. The first sending module 520 may be configured to send port scan packets based on at least two port pairs to the destination measurement point 560, where each port pair includes a source port number and a destination port number and corresponds to a path between the source measurement point 510 and the destination measurement point 560. The first receiving module 525 may be configured to receive a response packet sent by the destination measurement point 560, where the response packet carries a port pair which does not receive a port scan packet and is determined by the destination measurement point 560 based on the port scan packets. The first determination module 530 may be configured to, based on the port pair carried in the response packet, determine a faulty path.

The destination measurement point 560 includes a second receiving module 565, a second determination module 570, and a second sending module 575. The second receiving module 565 may be configured to receive the port scan packets from the source measurement point 510. The second determination module 570 may be configured to, based on the port scan packets, determine a port pair which does not receive a port scan packet. The second sending module 575 may be configured to send, to the source measurement point 510, the response packet carrying the determined port pair.

The operation of the destination measurement point 560 corresponds to the operation of the source measurement point 510. The second receiving module 565 of the destination measurement point 560 receives the port scan packets sent by the first sending module 520 of the source measurement point 510. The second sending module 575 of the destination measurement point 560 sends the response packet to the first receiving module 525 of the source measurement point 510, where the port pair carried in the response packet is obtained by the second determination module 570 of the destination measurement point 560. Therefore, for the foregoing and other operations and/or functions of the first sending module 520, the first receiving module 525, the first determination module 530, the second receiving module 565, the second determination module 570, and the second sending module 575, reference may be made to corresponding parts in S110 to S130 in the foregoing fault detection method 100, which is not described herein again to avoid repetition.

In the system provided by the embodiment of the present invention, the source measurement point sends, based on multiple port pairs, port scan packets for detecting a path fault, so that the port scan packets can reach the destination measurement point through multiple paths, and the destination measurement point can determine, according to the port pairs carried in the received port scan packets, a port pair which does not receive a port scan packet, so as to determine a faulty path based on the port pair which does not receive a port scan packet. In this way, the port scan packets can pass through paths corresponding to different port pairs, so as to implement detection of multiple paths between the source measurement point and the destination measurement point. Compared with the prior art where only one path can be detected, the present invention can implement more efficient fault detection and accurately find existence of a fault in the network.

Figure 6:
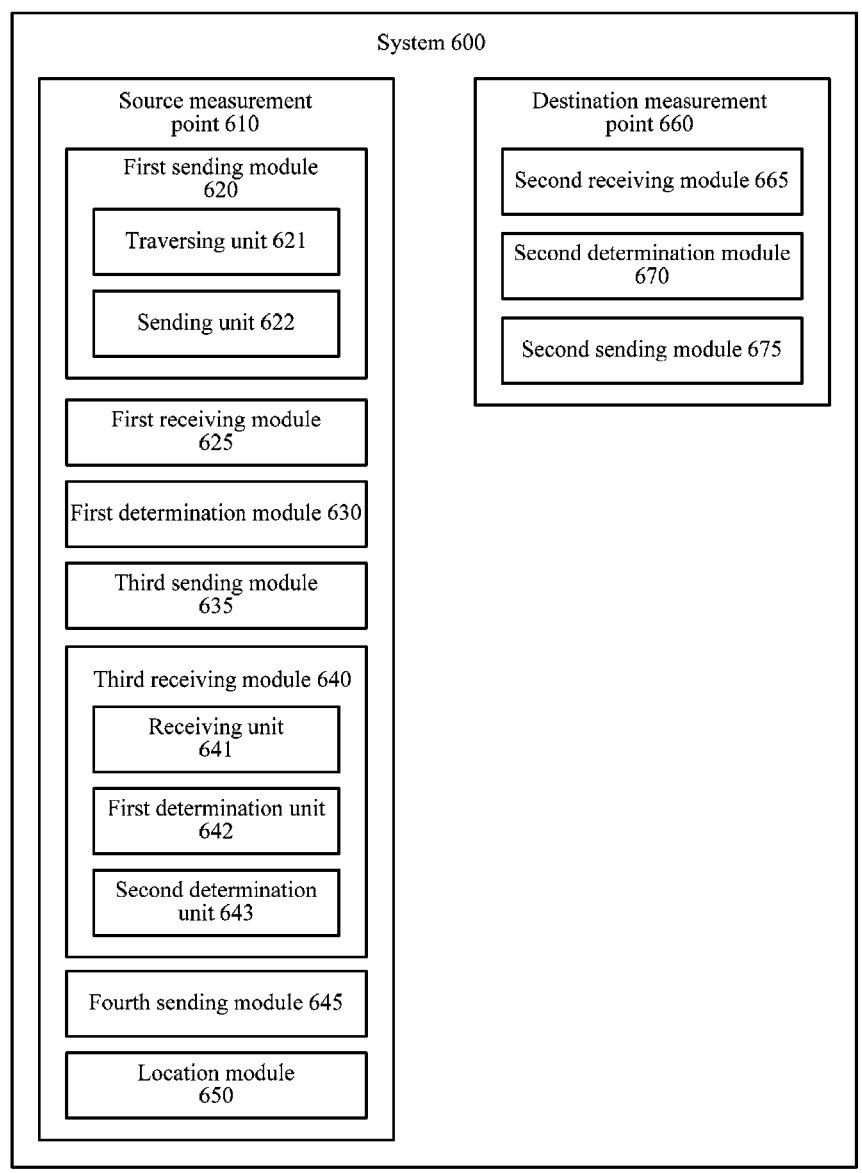
FIG. 6 is a structural block diagram of another system for fault detection according to an embodiment of the present invention.

FIG. 6 is a structural block diagram of a system for fault detection 600 according to an embodiment of the present invention.

The system 600 includes a source measurement point 610 and a destination measurement point 660. A first sending module 620, a first receiving module 625 and a first determination module 630 in the source measurement point 610 are basically the same as the first sending module 520, the first receiving module 525, and the first determination module 530 in the source measurement point 510. A second receiving module 665, a second determination module 670 and a second sending module 675 in the destination measurement point 660 are basically the same as the second receiving module 565, the second determination module 570, and the second sending module 575 in the destination measurement point 510.

According to an embodiment of the present invention, the first sending module 620 in the source measurement point 610 may include a traversing unit 621 and a sending unit 622. The traversing unit 621 may be configured to sequentially traverse at least two port pairs. The sending unit 622 may be configured to, based on a currently traversed port pair, send a port scan packet based on the port pair to the destination measurement point 660.

According to an embodiment of the present invention, the first sending module 620 may be configured to send port scan packets based on the at least two port pairs to the destination measurement point 660, where a source port number and a destination port number in each port pair are equal. In this way, during scanning based on the port pairs, sequential scanning is performed in a manner that the source port number is equal to the destination port number.

According to an embodiment of the present invention, the source measurement point 610 may also include a third sending module 635 and a third receiving module 640. The third sending module 635 may be configured to send, to the destination measurement point 660, a negotiation request packet for determining whether the destination measurement point 660 supports the port scan packet. The third receiving module 640 may be configured to receive a negotiation response packet that is sent by the destination measurement point 660 and used for indicating that the port scan packet is supported.

According to an embodiment of the present invention, the third receiving module 635 may be configured to send an ICMP echo request packet to the destination measurement point 660, where an option field of the ICMP echo request packet is filled with a first identifier. In this case, the third receiving module 640 may include a receiving unit 641, a first determination unit 642, and a second determination unit 643. The receiving unit 641 may be configured to receive an ICMP echo response packet returned from the destination measurement point 660. The first determination unit 642 may be configured to determine whether an option field of the ICMP echo response packet is filled with a second identifier different from the first identifier. The second determination unit 643 may be configured to, if it is determined that the option field is filled with the second identifier, determine that the ICMP echo response packet is the negotiation response packet.

According to an embodiment of the present invention, the port scan packet sent by the first sending module 620 may be identified by a DF flag bit, an MF flag bit, and an offset field in an IP header.

For example, in the port scan packet, the DF flag bit has a value of 1 and is used to indicate that fragmenting is not performed; the MF flag bit has a value of 0 and is used to indicate that no more fragment exists; and the offset field has a value being not all 0 and is used to indicate, in combination with the DF flag bit and the MF flag bit, that the packet is a port scan packet.

According to an embodiment of the present invention, the source measurement point 610 may also include a fourth sending module 645 and a location module 650. The fourth sending module 645 may be configured to send a fault location packet to the destination measurement point 660 based on the port pair carried in the response packet. The location module 650 may be configured to locate a fault in a path based on a TTL field of the fault location packet.

For the foregoing operations and/or functions of the first sending module 620, the third sending module 535, the third receiving module 540, the receiving unit 641, the first determination unit 642, the second determination unit 643, the fourth sending module 645, and the location module 650, reference may be made to S110 in the method 100, S202, S204, S232, and S234 in the method 200, and S310 to S340 in the method 300.

In the system according to the embodiment of the present invention, the source measurement point uses the third sending module and the third receiving module to determine, before the fault detection, whether the destination measurement point supports the port scan packet, so as to prevent the port scan packet from being sent blindly and an unnecessary processing burden from being brought to a destination end that does not support the port scan packet, so that a fault detection process can be effectively performed. When an existing ICMP echo request packet and ICMP echo response packet are used to determine whether the destination measurement point supports the port scan packet, because only the option field is filled with an identifier at the same time when a Ping operation is performed, it is convenient to determine whether the destination measurement point supports the port scan packet, and the implementation is simple. Furthermore, by using the fourth sending module and the location module, the fault location packet such as a UDP datagram and a TCP datagram may be used to locate the fault based on a Traceroute operation after the fault detection, so as to determine a specific position of the fault more accurately, thereby being beneficial to fault elimination and repair.

Persons of ordinary skill in the art may be aware that, the method steps and units described in combination with the embodiments disclosed in this document can be implemented by electronic hardware, computer software, or a combination of the two. To clearly describe the interchangeability between the hardware and the software, the foregoing description has generally described compositions and steps of every embodiment according to functions. Whether the functions are executed by hardware or software depends on particular applications and design constraint conditions of the technical solutions. Persons skilled in the art may use different methods to implement the described functions for every particular application, but it should not be considered that the implementation goes beyond the scope of the present invention.

The method steps described in combination with the embodiments disclosed in this document may be implemented by hardware, a software program executed by a processor, or a combination of the two. The software program can be stored in a random access memory (RAM), a memory, a read-only memory (ROM), an electrically programmable ROM, an electrically erasable programmable ROM, a register, a hard disk, a removable magnetic disk, or a CD-ROM, or any other type of storage medium commonly known in the art.

Although some embodiments of the present invention are shown and described, persons skilled in the art should understand that, various modifications may be made to these embodiments without departing from the principle and the spirit of the present invention, as long as such modifications shall fall within the scope of the present invention.

What is claimed is:

1. A method for detecting a faulty path between a source network unit and a target network unit, wherein there are a plurality of port pairs between the source network unit and the target network unit, each port pair corresponds to a path, the method performed by the source network unit comprising:
   traversing the port pairs in a sequence, each of which includes a source port ID of the source network unit and a destination port ID of the target network unit;
   generating a plurality of port scan packets, each includes a traversed port pair;
   sending the port scan packets to the target network unit;
   receiving a response packet from the target network unit, wherein the response packet includes a faulty port pair which is not received by the target network unit; and
   determining a faulty path based on the faulty port pair.

2. The method according to claim 1, wherein the source port ID is identical to the destination port ID.

3. The method according to claim 1, wherein before the sending the port scan packets, the method further comprises:
   sending a negotiation request packet for determining whether the target network unit supports the port scan packets to the target network unit; and
   receiving a negotiation response packet from the target network unit, wherein the negotiation response packet indicates that the port scan packets can be supported by the target network unit.

4. The method according to claim 3, wherein the sending the negotiation request packet for determining whether the target network unit supports the port scan packets to the target network unit comprises:
   sending an ICMP echo request packet to the target network unit, wherein an option field of the ICMP echo request packet is filled with a first identifier; and
   the receiving the negotiation response from the target network unit comprises:
   receiving an ICMP echo response packet from the target network unit; and
   determining that the ICMP echo response packet is a response packet to the ICMP echo request packet by checking an option field of the ICMP echo response packet being filled with a second identifier different from the first identifier.

5. The method according to claim 1, wherein each port scan packet is identified by a DF flag bit, and an MF flag bit, and an offset field in an IP header.

6. The method according to claim 5, wherein
   the DF flag bit has a value of 1 and is used to indicate that fragmenting is not performed;
   the MF flag bit has a value of 0 and is used to indicate that no more fragment exists; and
   the offset field has a value being not all 0.

7. The method according to claim 1, further comprising:
   sending a fault location packet to the target network unit based on the faulty port pair; and
   locating a fault in the faulty path based on a TTL field of the fault location packet.

8. The method according to claim 7, wherein the port scan packets comply with a user datagram protocol or a transmission control protocol; and
   wherein the fault location packet is complied with the user datagram protocol or the transmission control protocol.

9. The source network unit according to claim 7, wherein the source port ID is identical to the destination port ID.

10. A source network unit for detecting a faulty path between the source network unit and a target network unit, wherein there are a plurality of port pairs between the source network unit and the target network unit, each port pair corresponds to a path, the source network comprising:
    an interface for communicating with the target network unit; and
    a processor configured to:
    traverse the port pairs in a sequence, each of which includes a source port ID of the source network unit and a destination port ID of the target network unit, wherein the source port ID is identical to the destination port ID;
    generate a plurality of port scan packets, wherein each of the plurality of port scan packets includes a traversed port pair;
    send the plurality of port scan packets to the target network unit through the interface;
    receive a response packet from the target network unit through the interface, wherein the response packet includes a faulty port pair which is not received by the target network unit; and
    determine a faulty path based on the faulty port pair.

11. The source network unit according to claim 10, wherein the processor is further configured to:
    send a negotiation request packet for determining whether the target network unit supports the port scan packets to the target network unit before the sending the port scan packets; and
    receive a negotiation response packet from the target network unit through the interface, wherein the negotiation response packet indicates that the port scan packets can be supported by the target network unit.

12. The source network unit according to claim 11, wherein the processor is configured to
    send an ICMP echo request packet to the target network unit through the interface, wherein an option field of the ICMP echo request packet is filled with a first identifier;

and wherein the processor is configured to receive an ICMP echo response packet from the target network unit; and determine that the ICMP echo response packet is a response packet to the ICMP echo request packet by checking an option field of the ICMP echo response packet being filled with a second identifier different from the first identifier.

13. The source network unit according to claim 10, wherein each port scan packet is identified by a DF flag bit, and an MF flag bit, and an offset field in an IP header.

14. The source network unit according to claim 13, wherein the DF flag bit has a value of 1 and is used to indicate that fragmenting is not performed;

the MF flag bit has a value of 0 and is used to indicate that no more fragment exists; and the offset field has a value being not all 0.

15. The source network unit according to claim 10, wherein the processor is further configured to:

send a fault location packet to the target network unit based on the faulty port pair through the interface; and locate a fault in the faulty path based on a TTL field of the fault location packet.

16. The source network unit according to claim 15, wherein the port scan packets comply with a user datagram protocol or a transmission control protocol; and wherein the fault location packet complies with the user datagram protocol or the transmission control protocol.

* * * * *